United States Patent
Gorlov (10) Patent No.: US 6,293,835 B2
(45) Date of Patent: Sep. 25, 2001

(54) SYSTEM FOR PROVIDING WIND PROPULSION OF A MARINE VESSEL USING A HELICAL TURBINE ASSEMBLY

(75) Inventor: Alexander M. Gorlov, Brookline, MA (US)

(73) Assignee: Northeastern University, Boston, MA (US)

(*) Notice: Subject to any disclaimer, the term of this patent is extended or adjusted under 35 U.S.C. 154(b) by 0 days.

(21) Appl. No.: 09/729,884

(22) Filed: Dec. 5, 2000

Related U.S. Application Data (62) Division of application No. 09/524,655, filed on Mar. 13, 2000, now Pat. No. 6,155,892, which is a division of application No. 08/806,563, filed on Feb. 25, 1997, now Pat. No. 6,036,443, which is a continuation of application No. 08/452,824, filed on May 30, 1995, now Pat. No. 5,642,984, which is a continuation-in-part of application No. 08/241,762, filed on Apr. 22, 1994, now Pat. No. 5,451,137, which is a continuation-in-part of application No. 08/179,965, filed on Jan. 11, 1994, now Pat. No. 5,541,138.

(51) Int. Cl.$^7$ ............................................... B63H 9/00
(52) U.S. Cl. ..................................................... 440/8
(58) Field of Search ........................ 440/8; 416/176–178

(56) References Cited

U.S. PATENT DOCUMENTS

| | | |
|---|---|---|
| 85,508 | 1/1869 | Beach . |
| 135,459 | 2/1873 | Yarrell . |
| 464,607 | 12/1891 | Brown . |
| 625,614 | 5/1899 | Thompson . |
| 707,857 | 8/1902 | Marburg . |
| 868,798 | 10/1907 | McLaughlin . |
| 893,052 | 7/1908 | Carlson . |
| 903,592 | 11/1908 | Low . |
| 969,522 | 9/1910 | Carlson . |
| 996,309 | 6/1911 | Carlson . |
| 1,001,291 | 8/1911 | McKenzie . |
| 1,064,695 | 6/1913 | De Koning . |

(List continued on next page.)

FOREIGN PATENT DOCUMENTS

| | | | |
|---|---|---|---|
| 340945 | 10/1959 | (CH) | ..................................... 415/53.2 |
| 535624 | 10/1931 | (DE) | ............................... 416/DIG. 6 |

(List continued on next page.)

OTHER PUBLICATIONS

P R S White, *A Phenimenological Design Tool for Wells Turbines*, Department of Mechanical and Manufacturing Systems, Coventry Polytechnic, UK, pp. 53–58, undated.

M. E. McCormick, B. Cochran, *A Performance Study Of a Bi–Directional Radial Turbine*, U.S. Naval Academy and Johns Hopkins University, U.S.A., 6 pages, undated.

Primary Examiner—Ed Swinehart
(74) Attorney, Agent, or Firm—Weingarten, Schurgin, Gagnebin & Hayes LLP (57) ABSTRACT

A helical turbine assembly capable of providing high speed unidirectional rotation under a multidirectional ultra low-head fluid flow is disclosed. The assembly comprises an array of helical turbine units or modules arranged, vertically or horizontally, to harness, for example, water or wind power. Each turbine unit or module comprises a plurality of helical blades having an airfoil profile. The modules for wind power may be mounted to rotatable shafts supported by lightweight structures anchored by guy wires to the ground. The helical turbine can also provide ship propulsion by utilizing the power of ocean waves. In a further embodiment, a cylindrical distributor is provided in the helical turbine to channel the fluid flow to the blades of the turbine, thereby increasing efficiency and power output. The helical turbine with distributor may be used to lift or lower a body either being submerged into a fast stream or dragged in the fluid. The turbine may also include two or more rings of helical blades to increase torque and power output.

3 Claims, 12 Drawing Sheets

U.S. PATENT DOCUMENTS

| | | |
|---|---|---|
| 1,089,239 | 3/1914 | Mason . |
| 1,105,846 | 8/1914 | Schneider ............................ 415/53.2 |
| 1,396,609 | 11/1921 | Weisenborn . |
| 1,504,259 | 8/1924 | Miller . |
| 1,767,995 | 6/1930 | McChesney . |
| 1,830,985 | 11/1931 | Dreier . |
| 1,835,018 | 12/1931 | Darrieus . |
| 2,098,876 | 11/1937 | Nash ........................................ 61/20 |
| 2,106,928 | 2/1938 | Lee ....................................... 416/178 |
| 3,033,441 | 5/1962 | Coester ................................ 230/125 |
| 3,212,470 | 10/1965 | Wiggin . |
| 3,233,574 | 2/1966 | Justinien ................................ 115/19 |
| 3,561,392 | 2/1971 | Baez ........................................ 115/12 |
| 3,818,703 | 6/1974 | Lapeyre ................................. 60/504 |
| 3,818,704 | 6/1974 | Layeyre ................................. 60/504 |
| 3,941,504 | 3/1976 | Snarbach ......................... 416/197 A |
| 3,964,189 | 6/1976 | Belokin, Jr. ............................. 40/33 |
| 3,980,527 | 9/1976 | Lapeyre ................................ 202/175 |
| 3,986,787 | 10/1976 | Mouton, Jr. et al. ..................... 415/7 |
| 4,012,163 | 3/1977 | Baumgartner et al. ................... 415/2 |
| 4,048,947 | * 9/1977 | Sicard ....................................... 440/8 |
| 4,084,102 | 4/1978 | Fry et al. ................................ 290/55 |
| 4,084,918 | 4/1978 | Pavlecka ................................. 415/1 |
| 4,086,026 | 4/1978 | Tamanini .............................. 416/176 |
| 4,087,990 | 5/1978 | Gillette ................................... 64/2 P |
| 4,124,329 | 11/1978 | Romanov et al. ....................... 415/85 |
| 4,134,707 | 1/1979 | Ewers ........................................ 415/4 |
| 4,151,424 | 4/1979 | Bailey ................................... 290/54 |
| 4,162,410 | 7/1979 | Amick ................................... 290/55 |
| 4,217,501 | 8/1980 | Allison .................................. 290/55 |
| 4,218,175 | 8/1980 | Carpenter ................................ 415/2 |
| 4,222,700 | 9/1980 | Leuthard ................................. 415/7 |
| 4,234,289 | 11/1980 | Lebost ................................. 415/2 R |
| 4,245,475 | 1/1981 | Girden ................................. 60/641 |
| 4,275,989 | 6/1981 | Gutiérrez Atencio ............... 415/129 |
| 4,293,273 | 10/1981 | Romanov et al. ...................... 415/78 |
| 4,293,274 | 10/1981 | Gilman ................................... 416/51 |
| 4,295,783 | 10/1981 | Lebost ................................. 415/2 R |
| 4,357,130 | 11/1982 | Forrest ........................... 416/197 A |
| 4,368,392 | 1/1983 | Drees ................................... 290/438 |
| 4,384,212 | 5/1983 | Lapeyre ................................. 290/53 |
| 4,412,417 | 11/1983 | Dementhon .......................... 60/497 |
| 4,430,044 | 2/1984 | Liljegren ............................. 416/119 |
| 4,435,124 | 3/1984 | Zheng ................................. 416/119 |
| 4,443,708 | 4/1984 | Lapeyre ................................. 290/53 |
| 4,490,232 | 12/1984 | Lapeyre .............................. 204/278 |
| 4,548,073 | 10/1985 | Ludden ................................... 73/185 |
| 4,555,218 | 11/1985 | Jonsson et al. ........................ 416/17 |
| 4,609,827 | 9/1986 | Nepple ................................... 290/44 |
| 4,708,592 | 11/1987 | Krolick et al. .................... 416/176 A |
| 4,849,647 | 7/1989 | McKenzie ............................... 290/54 |
| 5,074,710 | 12/1991 | Gorlov ................................... 405/76 |
| 5,222,833 | 6/1993 | Gorlov ................................... 405/76 |
| 5,405,246 | 4/1995 | Goldberg ........................ 416/227 A |
| 5,451,137 | 9/1995 | Gorlov ................................. 416/178 |
| 5,642,984 | * 7/1997 | Gorlov ................................. 416/176 |
| 6,036,443 | * 3/2000 | Gorlov ................................. 416/176 |

FOREIGN PATENT DOCUMENTS

| | | | |
|---|---|---|---|
| 908689 | 9/1980 | (DE) | ..................... 415/53.2 |
| 948060 | 6/1981 | (DE) | ................. 416/227 A |
| 596275 | 8/1981 | (GB) . | |
| 165008 | 4/1986 | (GB) | ..................... 416/176 A |
| 508969 | 1/1955 | (IT) | ..................... 416/DIG. 6 |
| 357874 | 3/1988 | (JP) | ..................... 416/176 A |
| 287792 | 10/1992 | (JP) . | |
| 242637 | 7/1986 | (SU) | ................. 416/227 A |

* cited by examiner

SYSTEM FOR PROVIDING WIND PROPULSION OF A MARINE VESSEL USING A HELICAL TURBINE ASSEMBLY

CROSS REFERENCE TO RELATED APPLICATIONS

This application is a divisional of application Ser. No. 09/524,655 filed on Mar. 13, 2000 now U.S. Pat. No. 6,155,892, which is a divisional of application Ser. No. 08/806,563 filed on Feb. 25, 1997 now U.S. Pat. No. 6,036,443, which is a continuation of application Ser. No. 08/452,824 filed on May 30, 1995, now U.S. Pat. No. 5,642,984, which is a continuation-in-part of application Ser. No. 08/241,762, filed on Apr. 22, 1994, now U.S. Pat. No. 5,451,137, which is a continuation-in-part of application Ser. No. 08/179,965, filed on Jan. 11, 1994, now U.S. Pat. No. 5,541,138, the disclosures of all of which are incorporated by reference herein.

FIELD OF THE INVENTION

This invention relates to turbines and more particularly to turbines capable of unidirectional rotation under multidirectional fluid flows for use with hydro-pneumatic, hydro, wind, or wave power systems.

BACKGROUND OF THE INVENTION

A unidirectional turbine is a turbine capable of providing unidirectional rotation from bidirectional or reversible fluid flow, such as in tidal estuaries or from shifting wind directions. Generally, three basic types of unidirectional reaction turbines are known, the Wells turbine, the McCormick turbine, and the Darrieus turbine.

Figure 1:
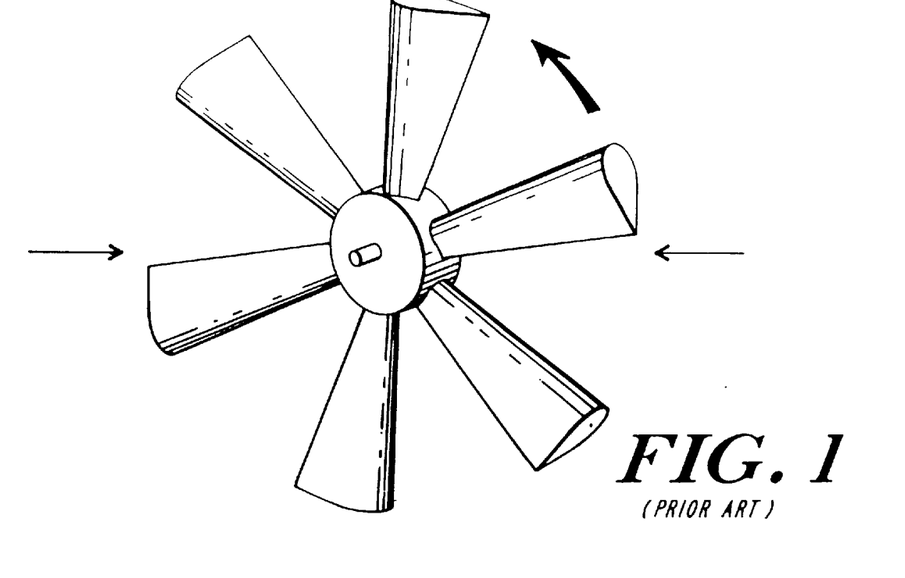
FIG. 1 is a schematic illustration of a prior art Wells turbine.

The Wells reaction turbine is a propeller-type turbine that comprises a series of rectangular airfoil-shaped blades arranged concentrically to extend from a rotatable shaft, as shown in FIG. 1. Typically, the turbine is mounted within a channel that directs the fluid flow linearly along the axis of the rotatable shaft. The blades are mounted to extend radially from the rotatable shaft and rotate in a plane perpendicular to the direction of fluid flow. Regardless of the direction in which the fluid flows, the blades rotate in the direction of the leading edge of the airfoils, which, in FIG. 1, is counterclockwise.

The Wells turbine is capable of rapid rotation. The outer ends of its blades move substantially faster than the flowing air, causing high noise. Also, its efficiency is relatively low, because the effective surface area of the airfoil-shaped blades is limited to the outer tips, where the linear velocity is greatest. The blades cannot capture a substantial amount of the available energy in the fluid flowing closer to the shaft.

Figure 2:
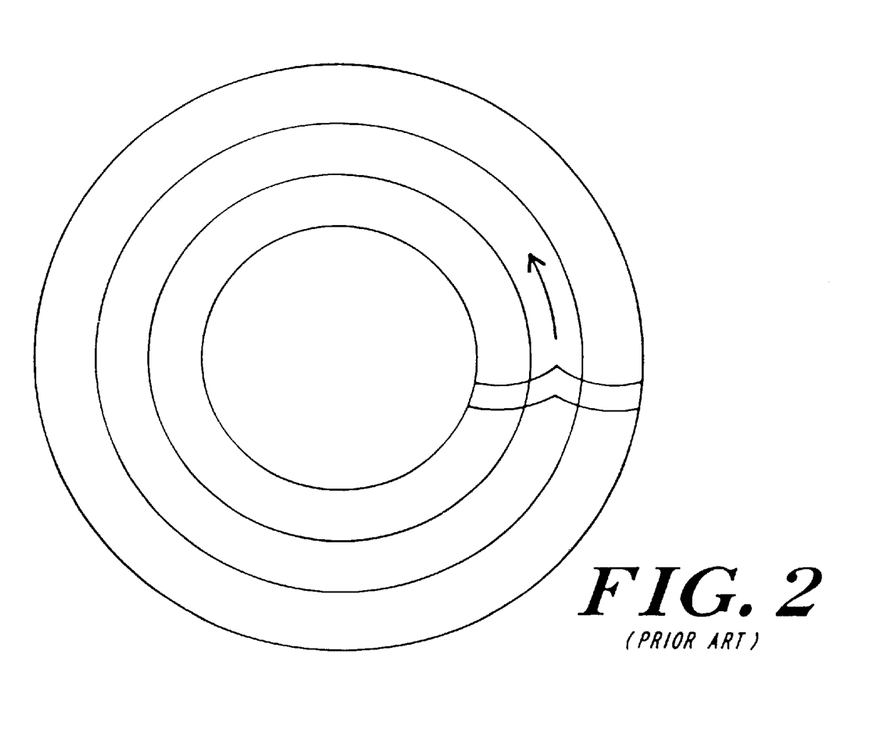
FIG. 2 is a schematic illustration of a prior art McCormick turbine.

The McCormick turbine comprises a series of V-shaped rotor blades mounted concentrically between two series of stator blades, as shown in FIG. 2. The rotor blades are mounted for rotation in a plane perpendicular to the direction of fluid flow. The stator blades direct fluid flow to the rotor blades. To achieve unidirectional rotation with bidirectional fluid flow, the outer stator blades are open to fluid flowing from one direction, while the inner stator blades are open to fluid flowing from the opposite direction.

The McCormick turbine is more quiet and could be more efficient than the Wells turbine. However, its rotational speed is too slow for direct operation of an electric generator. Its configuration is also complex and expensive to manufacture.

Figure 3:
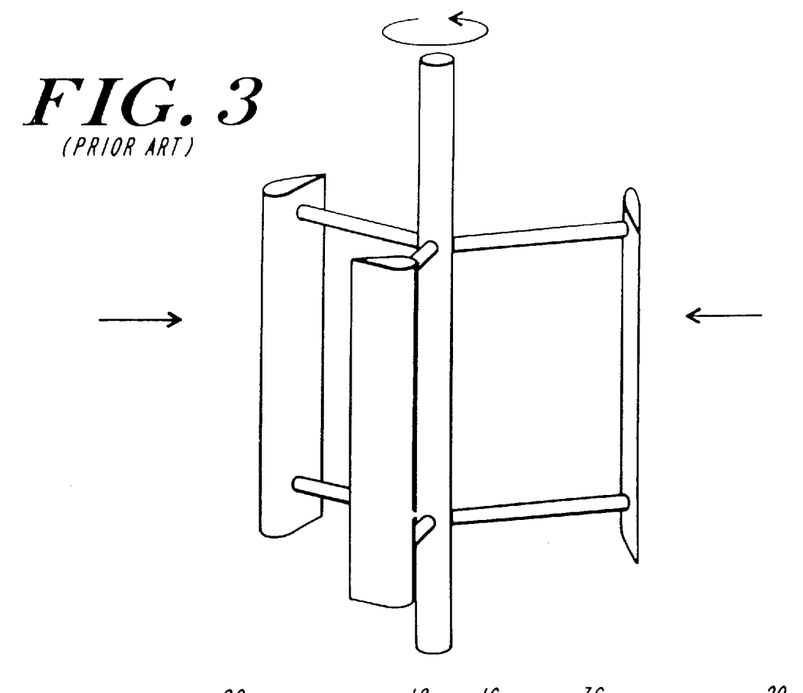
FIG. 3 is a schematic illustration of a prior art Darrieus turbine.

The Darrieus machine is a reaction turbine with straight airfoil-shaped blades oriented transversely to the fluid flow and parallel to the axis of rotation, as shown in FIG. 3. The blades may be attached to the axis by circumferential end plates, struts, or by other known means. In some variations, the blades are curved to attach to the ends of the axis. A Darrieus reaction turbine having straight rectangular blades, mounted vertically or horizontally in a rectangular channel, has been placed directly in a flowing body of water to harness hydropower. The Darrieus turbine rotates with a strong pulsation due to accelerations of its blades passing through the higher pressure zones in the fluid that lowers the efficiency of the turbine.

Thus, a need still exists for a quiet, efficient, uniformly rotational, simple, unidirectional turbine that can operate at high speeds.

SUMMARY OF THE INVENTION

The present invention provides a unidirectional helical turbine capable of achieving high speeds needed for industrial electric generators. The turbine comprises a working wheel having a plurality of airfoil-shaped helical blades mounted transversely to the direction of fluid flow for rotation in a plane parallel to the direction of fluid flow. The blades extend between two supporting members, such as a pair of parallel discs, mounted on a rotatable shaft. The blades rotate in the direction of the leading edge of the airfoil, regardless of the direction of fluid flow.

The helical configuration ensures that a portion of the blades are always positioned optimally with respect to the fluid flow, thereby creating maximum thrust to spin the turbine. The continuous helical blades provide a continuous speed of rotation uninterrupted by accelerations and decelerations that accompany the Darrieus turbine as the blades pass the least and most efficient thrust zones. The skewed leading edges of the helical configuration further reduce resistance to the turbine rotation. The helical blades are operable with or without a channel to direct the fluid flow.

In a further embodiment, a cylindrical distributor is provided within the helical blades, to channel the fluid to the blades of the turbine, thereby increasing the fluid velocity near the blades and the power output of the helical turbine. The helical turbine combined with the cylindrical distributor attached to the turbine may also be used as an apparatus for lifting or lowering bodies such as submarines or submersible barges.

The helical turbine may also be provided with multiple layers or rings of concentrically arranged helical blades. The blades of adjacent rings are shifted circumferentially such that they do not overlap each other in the fluid flow. That is, the inner blades are positioned within the spaces between the outer blades. The multilayer arrangement increases the torque and power output.

In a case when the helical turbine is used with a hydro-pneumatic energy converter, a channel interconnects a pair of chambers in which air is alternately compressed and expanded due to the alternate filling and emptying of the chambers with water. The alternate compression and expansion causes the air flow to alternate in direction through the connecting channel. The helical turbine, mounted in the channel, is in this manner able to capture the energy in the flowing air and convert it to rotary mechanical energy. The turbine is connected to an electric generator for generation of electrical energy. No additional gearing speed increaser is usually required, since the turbine rotates fast enough for conventional generators.

In a hydro application, the helical turbine may be mounted in a vessel located in a current of about 5 feet per second or greater, such as in a tidal channel. The turbine is located below the surface of the water, where the current velocity is greatest, and is retained in that location by virtue of the vessel's rise and fall with the water. The helical turbine embodiment is particularly suited to this application. A housing to channel the flow to the turbine may by provided if desired, but is not necessary if the current velocity is sufficiently great. The turbine is connected to a suitable electric generator, which may be mounted on the vessel in a water tight chamber. The turbine can also be used in conventional applications, such as in dams.

The helical turbine is also efficiently configured in a modular form comprising, preferably, two or more helical blades in spirals extending from one end to the other. For wind power applications, a plurality of modules is arrayed, vertically or horizontally, on rotatable shafts which are supported by lightweight structures anchored to the ground by guy wires. The optimally designed modules provide unidirectional and uniform, non-oscillating rotation in any non-zero angle between the turbine shaft and wind direction.

The helical turbine is also useful to provide propulsion or supplement engine-driven propulsion of a marine vessel utilizing the power of ocean waves. The helical turbine is operable under the multidirectional oscillations of ocean waves and can develop a substantial axial torque useful in the propulsion of marine vessels.

DESCRIPTION OF THE DRAWINGS

The invention will be more fully understood from the following detailed description taken in conjunction with the accompanying drawings in which.

DETAILED DESCRIPTION OF THE INVENTION

Figure 4:
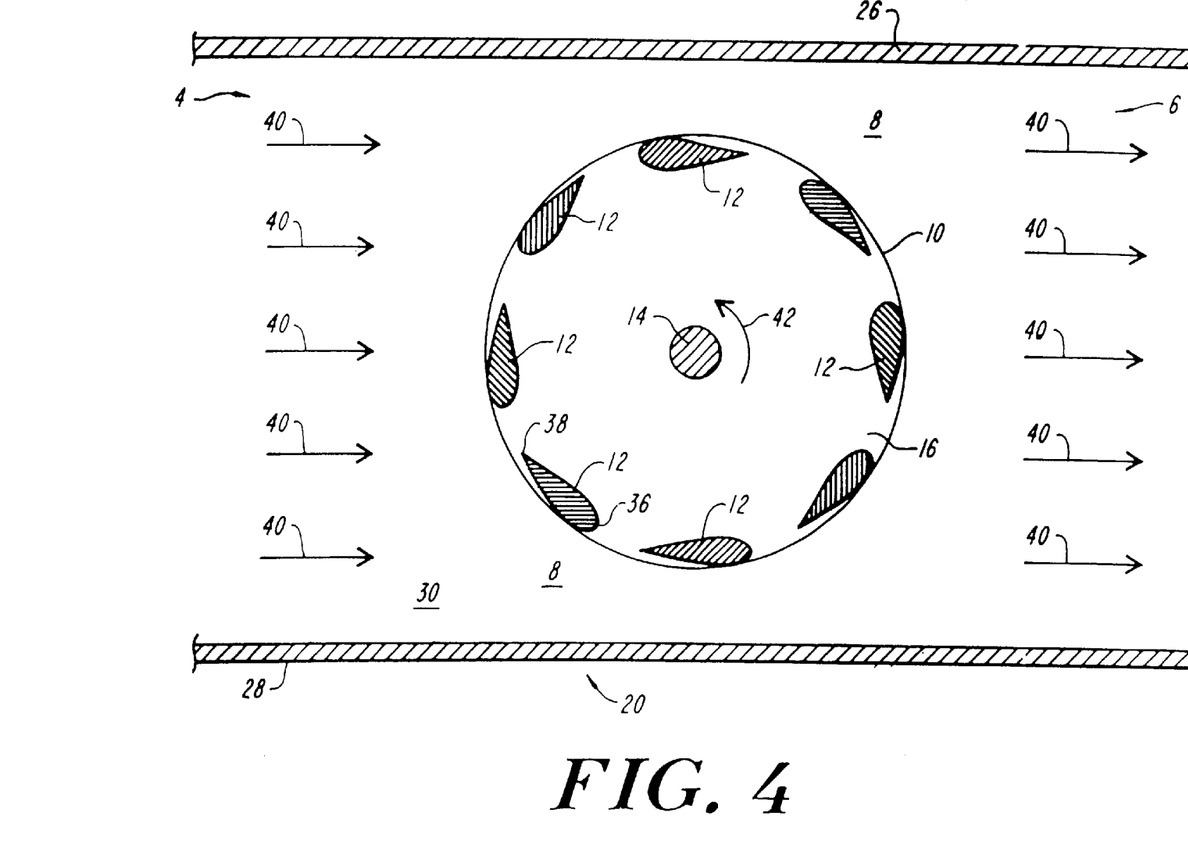
FIG. 4 is a cross-sectional side view of a helical turbine according to the present invention.
Figure 5:
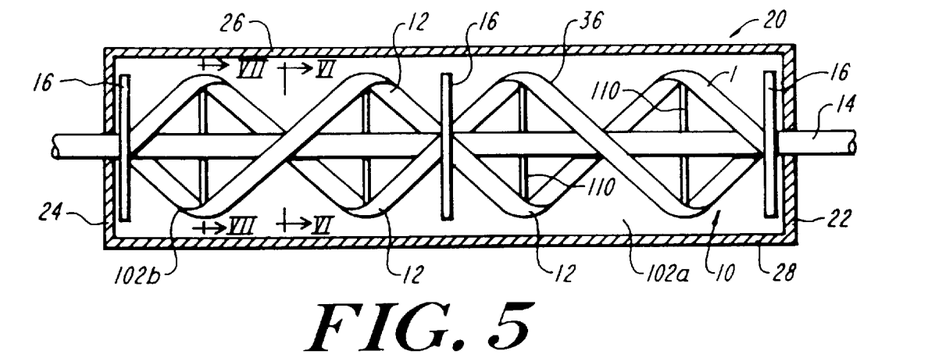
FIG. 5 is a frontal view of a helical turbine according to the present invention.
Figure 6:
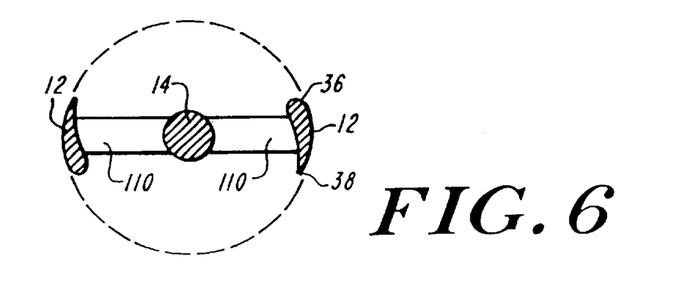
FIG. 6 is a cross-sectional view along line VI—VI of FIG. 5.
Figure 7:
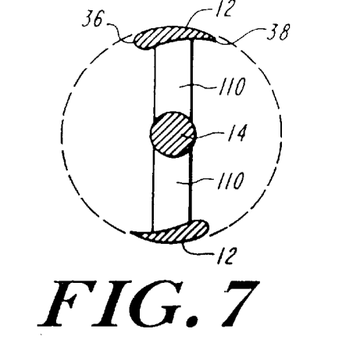
FIG. 7 is a cross-sectional view along line VII—VII of FIG. 5.
Figures 13, 14:
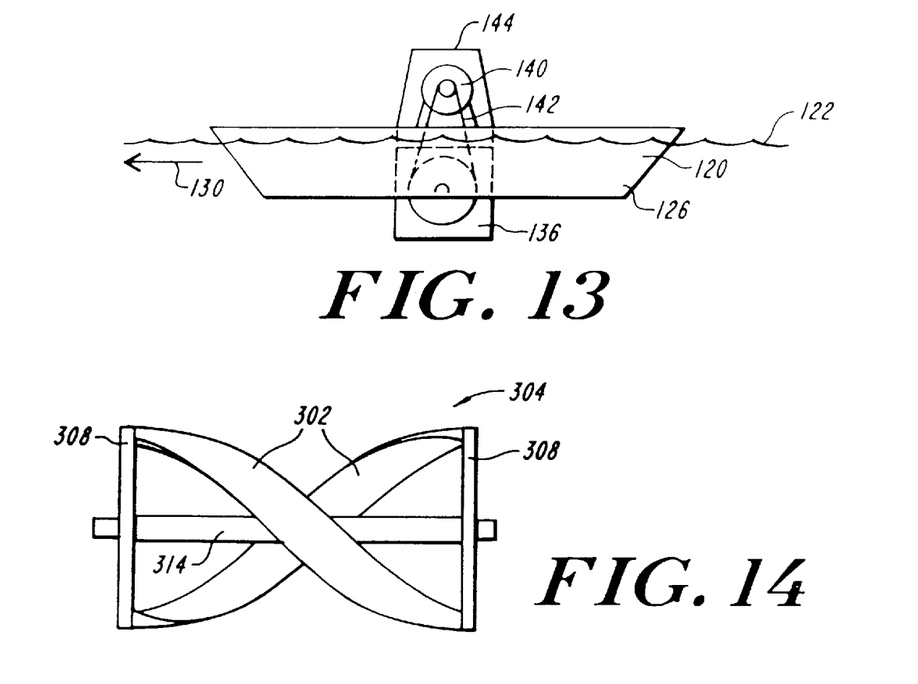
FIG. 13 is a side view of the system of FIG. 11.
FIG. 14 is a schematic view of a helical turbine module of a further embodiment of the present invention.

A helical turbine according to the present invention is shown in FIGS. 4, 5 and 14. The turbine 10 comprises a plurality of airfoil-shaped helical turbine blades 12 supported for rotation on a rotatable shaft 14 by one or more turbine blade support members 16. The airfoil-shaped blades may be formed from any suitable material, such as a steel or plastic material. The blade support members 16, which, in the embodiment shown, comprise parallel, circular discs, are fixedly mounted in spaced relation on the rotatable shaft 14 such that rotation of the blades 12 and discs 16 causes the shaft 14 to rotate as well. The blades 12 are fixedly mounted to extend helically from one disc 16 to the other disc 16 and are spaced radially from the rotatable shaft 14. The blade support members may comprise other configurations, such as a single central disc, radial spokes, or the like.

The turbine 10 may be free in a fluid flow or may be mounted inside a channel 20 or duct. The channel, if provided, generally comprises opposed side walls 22,24, a top wall 26, and a bottom wall 28 which form a passage 30 for directing the flow of fluid to the turbine. The shaft 14 is oriented transversely to the flow of fluid through the channel and is mounted for rotation, for example, via bearings in the side walls of the channel. Also, with the helical configuration, it is possible to eliminate the channel entirely if desired.

Each helical blade 12 has an airfoil shape with a leading edge 36 and a trailing edge 38 oriented transversely to the flow of fluid. Preferably, the blades are formed with a suitable airfoil profile, as is known in the art. The blades 12 are mounted at the outermost diameter of the circular discs 16 and are generally oriented to lie along a circle defined by the outer diameter of the discs such that the chord of each airfoil generally but not necessarily forms the chord of an arc of the circle. Any number of blades may be provided.

Referring to FIG. 4, fluid flowing in the direction of arrows 40 along the channel 20 causes the turbine 10 to rotate in the direction of the leading edge 36 of the blades as shown by arrow 42. Similarly, fluid flowing in the opposite direction along the channel 20 also causes the turbine to rotate in the same direction, the direction of the leading edge 36 of the blades 12. As is apparent, the turbine rotates in a plane parallel to the flow of fluid. The blades 12 should be spaced radially as far from the rotatable shaft 14 as practicable to capture the greatest amount of energy in the flowing fluid. The skewed leading edges 36 further reduce resistance to the turbine rotation.

The helical blades may be divided into two halves 102a, 102b, as shown in FIG. 5, in which one half is a left-handed helix and the other half is a right-handed helix. In this manner, the components of the thrust force which extend parallel to the shaft 14 cancel each other out, as discussed further below. However, all left-handed or all right-handed helixes or any other suitable helical configuration may be provided if desired. The blades are fixedly attached at their ends to extend transversely from one disc to the other disc, creating a non-solid, fluid transmitting cylinder. In addition, any suitable number of radial spokes 110 may be provided which extend perpendicularly from the rotatable shaft to each blade at spaced intervals. Such radial spokes increase the integrity and structural strength of the system. Alternatively, the blade support members may comprise other configurations, such as a single central disc, radial spokes alone, or the like.

Figure 8:
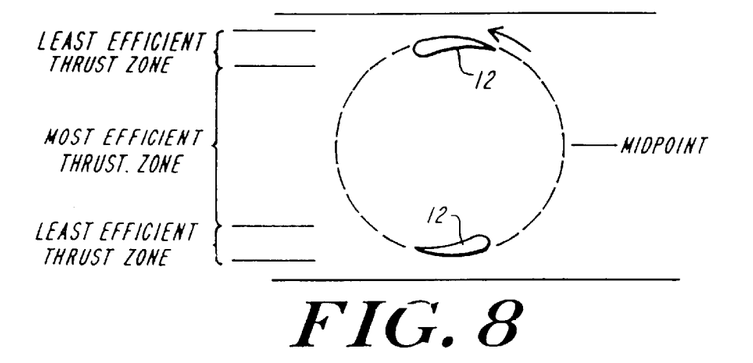
FIG. 8 is a schematic cross-sectional side view of a turbine according to the present invention illustrating zones of thrust efficiency.

In addition, a portion of the blades 12 are always positioned in the most efficient zones of the fluid pressure, thereby creating maximum thrust to spin the turbine. Two least efficient thrust zones, near the top and bottom walls, and a most efficient thrust zone, near the center, are depicted in FIG. 8 merely for illustrative purposes. It will be appreciated that in actuality the efficiency of the thrust varies continuously from a minimum at the top to a maximum at the midpoint to a minimum at the bottom, with no abrupt break therebetween. In this manner, the blades rotate continuously at a constant speed, without the accelerations and decelerations which accompany turbines in which the blades pass discontinuously through the most efficient and least efficient thrust zones.

Figure 9:
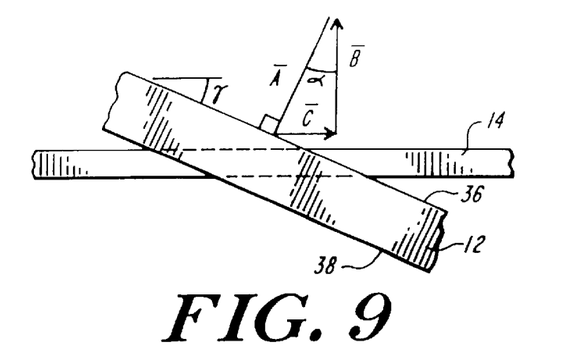
FIG. 9 is a fragmentary view of a single turbine blade of the embodiment of FIG. 5 illustrating resolution of the thrust force on the blade.

A resolution of the thrust force exerted on each blade is illustrated in FIG. 9. The thrust A exerted on each blade 12 is perpendicular to the leading edge 36 of the blade. The component B, perpendicular to the rotatable shaft 14, is the working component of the thrust A, the component which pushes the blade with respect to the shaft. The component C, parallel to the rotatable shaft 14, exerts a force parallel to the shaft on the shaft bearings. By providing two halves with oppositely directed helixes, as shown in FIG. 5, these components cancel each other out, thereby minimizing wear on the shaft bearings. The angle γ, the angle made by the leading edge of the blade with respect to the shaft depends on the particular application.

The helical turbine is particularly suitable for hydro applications where strong water currents develop, and may be installed on a vessel, as discussed further below, or in the body of any low-head dam in a river. The helical turbine is also suitable for harnessing wind and wave energy, as discussed below.

Figure 17:
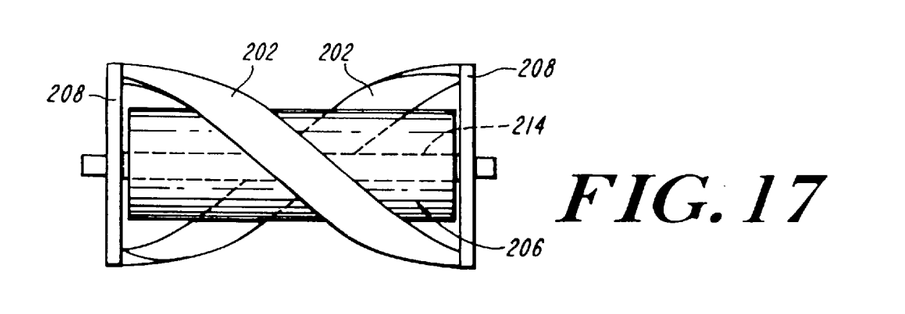
FIG. 17 is a front view of a further embodiment of a helical turbine of the present invention embodying a cylindrical distributor.
Figure 18:
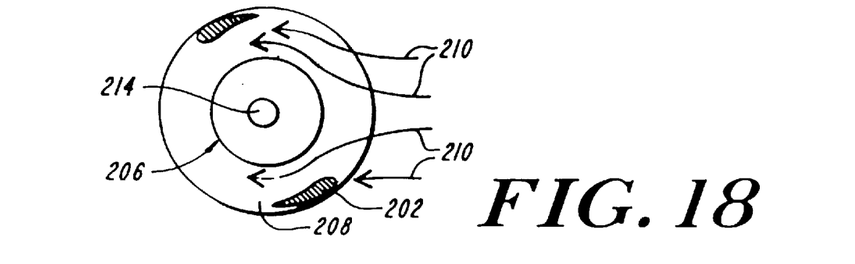
FIG. 18 is a cross-sectional side view of the helical turbine of FIG. 17.

In a further embodiment of the present invention shown in FIGS. 17 and 18, a distributor 206 comprising a generally cylindrical tubular member is provided in the turbine between the helical blades 202 and the shaft 214 to extend the length of the turbine between the turbine supports 208. The distributor 206 is disposed circumferentially about the shaft 214 and concentric with the helical blades 202. The distributor 206 redirects the fluid streams inside the turbine toward the outside rotating blades as indicated by arrows 210, thereby increasing the fluid flow near the blades and improving helical turbine efficiency and power output. The distributor can be fixed to the shaft to rotate with the blades (discussed further below) or it can remain motionless with respect to the blades, for example by providing suitable bearings between the distributor and support discs. If mounted for rotation, the cylindrical distributor can be mounted to rotate with the same angular velocity of the blades or a different angular velocity, as would be known by those skilled in the art.

A small scale helical turbine was tested with and without a distributor both in water and wind tunnels. The turbine was made from an epoxy-type resin. The test results indicate that turbine velocities and power output are substantially improved with inclusion of the fluid distributor. A more than double increase in efficiency can be achieved in some applications compared with a turbine without a distributor. Although shown in FIG. 17 with the helical turbine of the present invention, the cylindrical distributor can also be used with the Darrieus turbine.

Figure 22:
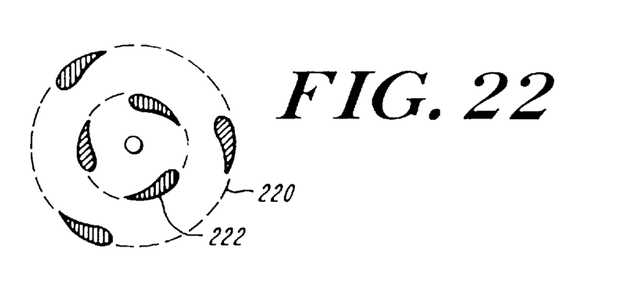
FIG. 22 is a cross-sectional side view of a multilayer helical turbine of the present invention.
Figure 23:
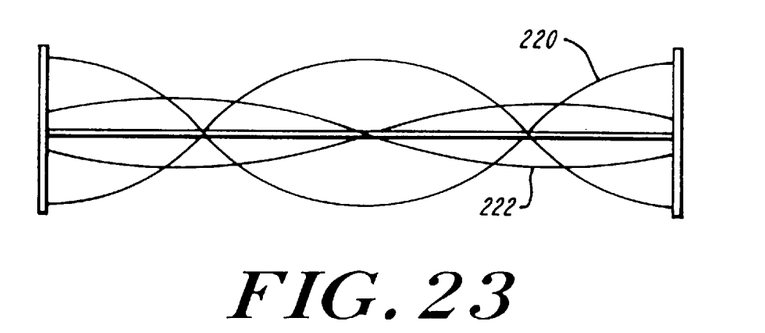
FIG. 23 is a schematic front view of a multilayer helical turbine of the present invention.

As shown in FIGS. 22 and 23, the helical turbine may also be provided with multiple layers or rings 220, 222 of concentrically arranged helical blades. FIG. 22 illustrates two rings, each having three helical blades. FIG. 23 schematically illustrates two rings each having two helical blades. Although two rings are shown, any suitable number of rings may be provided. Similarly, any suitable number of blades per ring may be provided. The spirals of blades of adjacent rings may be, but are not necessarily shifted with respect to each other to avoid shielding the inner blades by the outer blades. The multilayer arrangement provides greater torque and higher power. The multilayer helical turbine is operable under the high water heads found in conventional power plants, since the multiple rings increase resistance to the water flow maintaining high water pressure.

Figure 10:
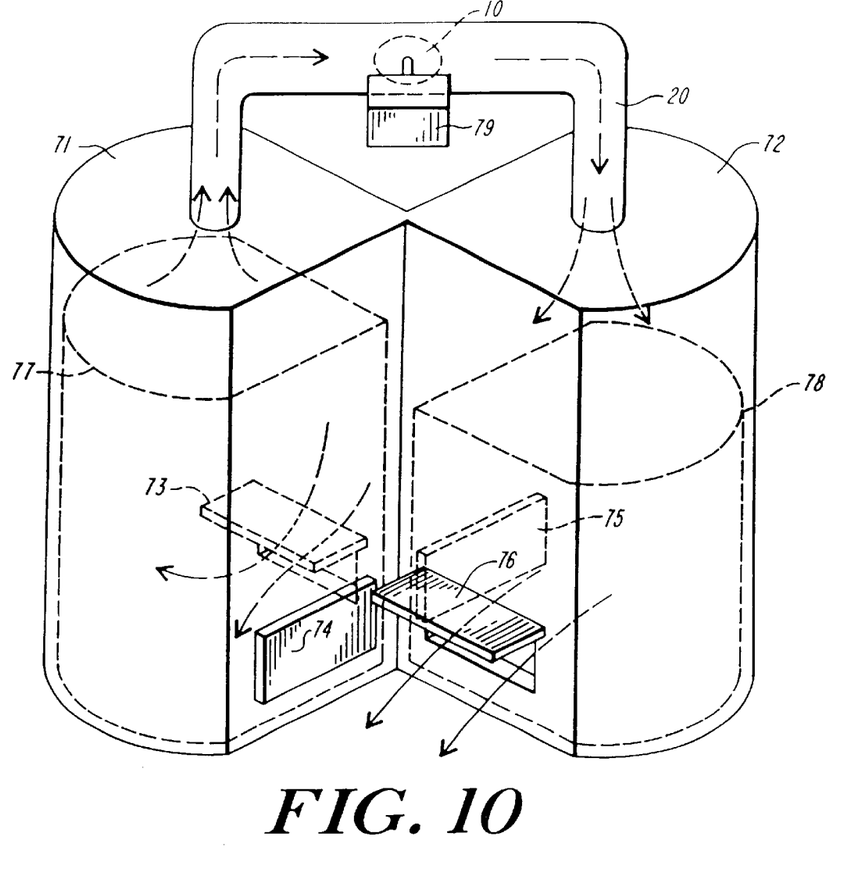
FIG. 10 is a schematic illustration of the turbine of the present invention in operation in a hydro-pneumatic power system.

The helical turbine of the present invention is shown in FIG. 10 in operation in association with a hydro-pneumatic power generation system, such as that disclosed in U.S. Pat. Nos. 5,074,710 or 5,222,833. As generally described above, the system comprises two water chambers 71, 72 interconnected by ingress and egress ports 73, 74, 75, 76 on common shafts. As the water level 77, 78 in the two chambers alternately rises and falls, air in the space above the water level is alternately compressed and expanded. The air flows through the channel 20 interconnecting the two chambers, alternating directions in synchronism with the rising and falling water levels.

The turbine 10 of the present invention is mounted within the channel. The flowing air causes the turbine to rotate as described above. When the flow of water through the chambers reverses, the flow of air through the channel also reverses. However, the turbine continues to rotate in the same direction. During the air flow cycle, the air flows in a first direction and the speed of the air increases to a maximum.

The turbine is connected in any suitable manner to an electric generator 79 for generating electricity. The turbine can reach speeds of 1800 or 3600 rpm with water heads of as low as one or two feet. Thus, the system is suitable for generating power on rivers of small grades where high dams are not applicable.

Figure 11:
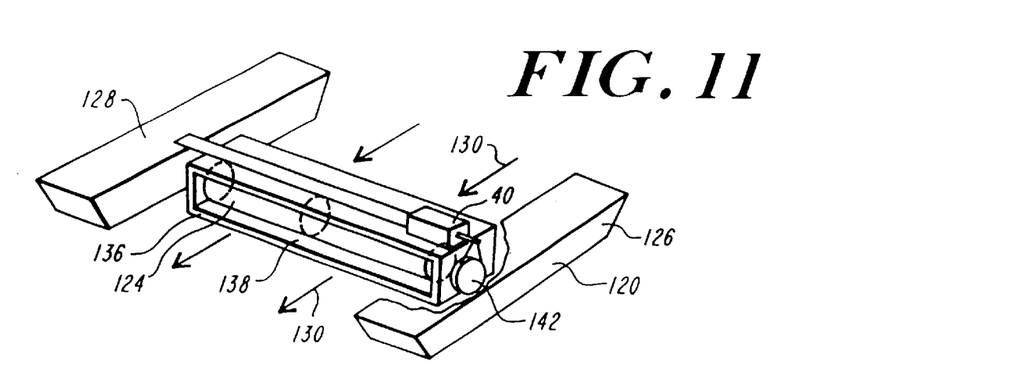
FIG. 11 is a perspective view of a system mounted on a catamaran for harnessing hydro energy according to the present invention.
Figure 12:
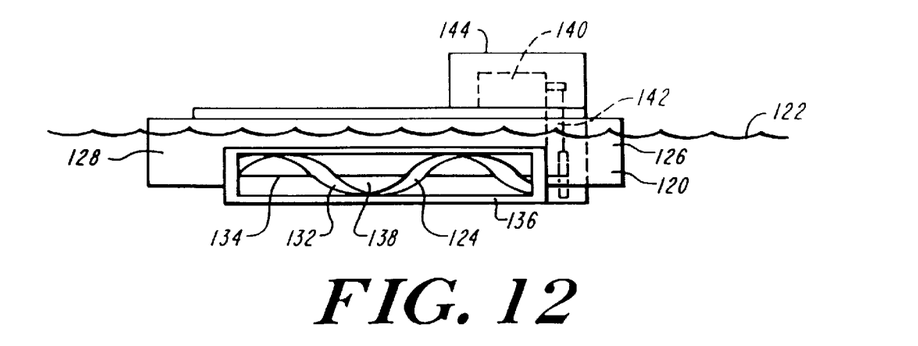
FIG. 12 is a frontal view of the system of FIG. 11.

The helical turbine of the present invention may be installed on a vessel 120, as shown in FIGS. 11 through 13. The vessel 120 rises and falls with the fluctuating water level 122, ensuring that the turbine remains always at the area of greatest velocity. A catamaran installation is shown in FIGS. 11 through 13, although any type of vessel or raft may be used. A helical turbine 124 according to the present invention, such as described in reference to any of the embodiments described herein, is mounted to extend between two pontoons or hulls 126, 128 of the catamaran and oriented perpendicularly to the current flow, illustrated by arrows 130. The turbine 124 is mounted below the water's surface 122, so that all of the turbine is submerged. Water flowing past the turbine blades 132 causes the blades 132 and shaft 134 to rotate, as discussed above.

Generally, the turbine is mounted either in a housing 136 having a turbine chamber such as described above or without a housing. The housing, if employed, may have front and back openings 138 therein to allow the current flow 130 to pass through the housing 136 and past the turbine blades 132. The housing may be mounted to the pontoons 126, 128 in any suitable manner. However, in some applications, such as if the current velocity is sufficiently great, the housing may not need to be provided. The shaft 134 may be connected to an electric generator 140 in any suitable manner, such as by a belted transmission 142. As shown, the electric generator may be housed in a suitable water tight chamber 144 on the vessel if desired.

In a further embodiment, the helical turbine can be efficiently configured as an optimal unit or module and combined in a modular array to harness water or wind power. The power available from a prior art propeller turbine is proportional to the circumferential velocity of the blades, which increases with distance from the turbine shaft. Thus, prior art turbines are traditionally designed with a maximum diameter. However, the size of such prior art turbines is limited by their strength and possibility of structural failures caused by centrifugal forces and vibrations when the diameter becomes too large. The helical turbine is advantageous in this regard, since its available power is proportional to a frontal rectangular area equal to the product of its diameter and its length, and the length is not related to angular velocity or centrifugal forces. A relatively small helical turbine module can be optimized for airfoil profile, angular velocity, diameter, and length, and an entire power system can be assembled from such modules. Such a power system can exploit a common shaft and generator for a number of modules and is simple to build and maintain.

A suitable helical turbine module 304 is shown in FIG. 14. The module comprises one or more helical blades 302 arranged in a spiral about a central shaft 314. Generally, at least two helical blades are used. The blades are attached to a turbine support, such as one or more discs 308 or radial spokes, which is connected to the central shaft 314, as discussed above. Preferably, the blades are made from a material which is strong and lightweight, such as aluminum or fiberglass, and may be hollow if desired.

Figure 15:
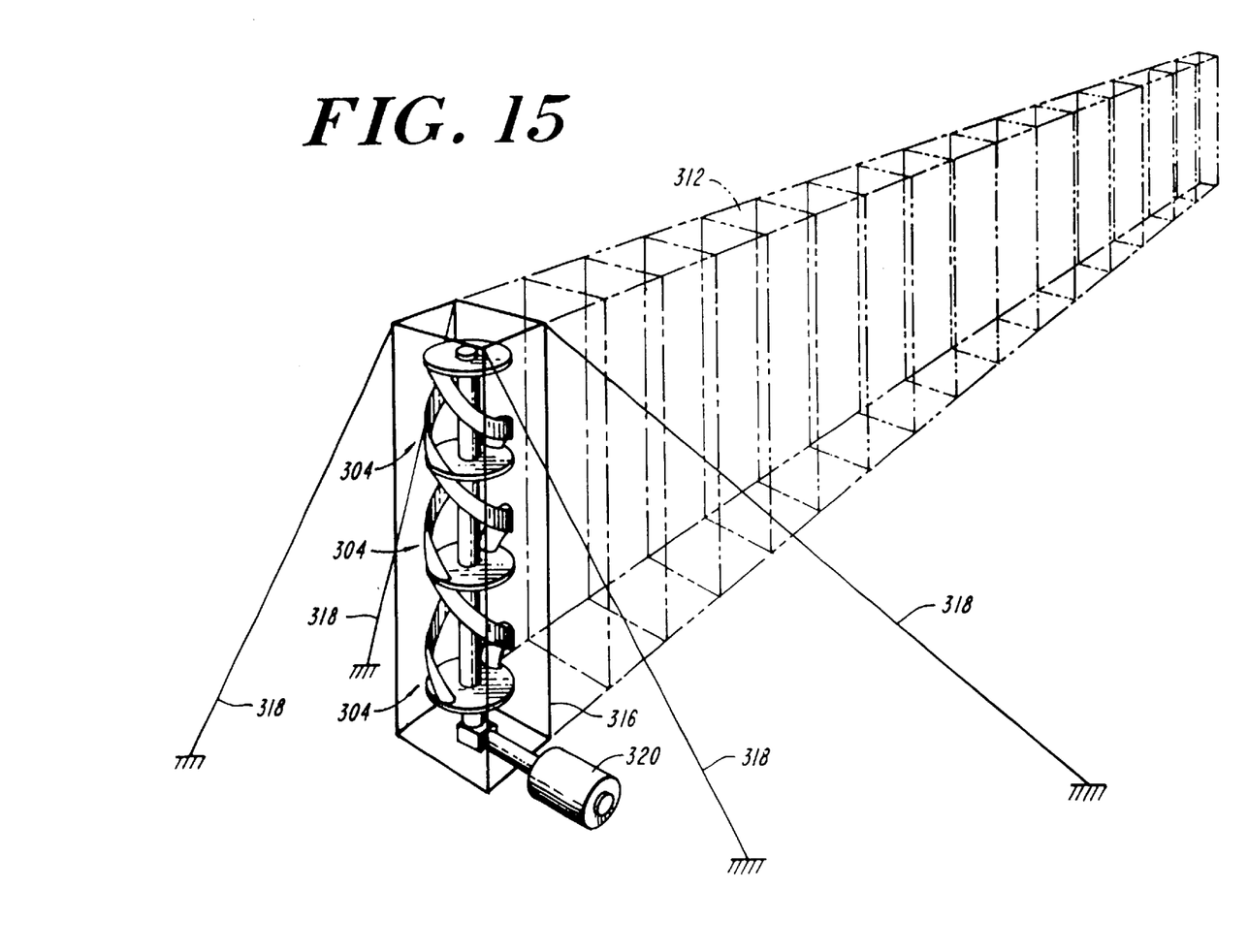
FIG. 15 is a schematic view of an array of the turbine modules of FIG. 14 arranged vertically.
Figure 21:
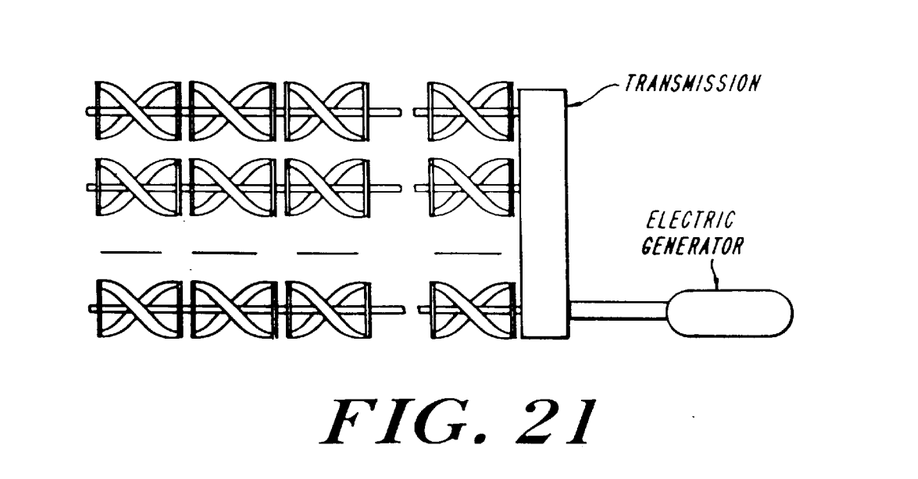
FIG. 21 is a schematic view of an array of turbines connected via a transmission to a single generator.

FIG. 15 illustrates a turbine module 304 such as in FIG. 14 combined in an array for harnessing wind power, in which the fluid flow can be multidirectional. The modules are stacked vertically end to end. Preferably, the modules are arranged with the direction of the spirals alternating, such that one module is left handed and an adjacent module is right handed. A plurality of vertically stacked modules are arrayed adjacent to each other to provide a wall 312 of turbine modules. Each vertical stack may be supported in any suitable manner. For example, structural members may be arranged to form a lightweight rectangular frame or truss 216, such as an antenna-type structure, around the vertical stack and anchored to the ground by guy wires 318. Any desired number of modules may be provided in any desired number of vertical stacks. One or more electrical generators 320 are provided in communication with the vertical shafts. A generator may be individually associated with each shaft, or plural shafts may be connected via a suitable transmission to a single generator, as shown in FIG. 21. The array of modular turbines may be located in any suitable windy location, as is known in the art, for example for locating traditional windmill-type wind farms.

Figure 16:
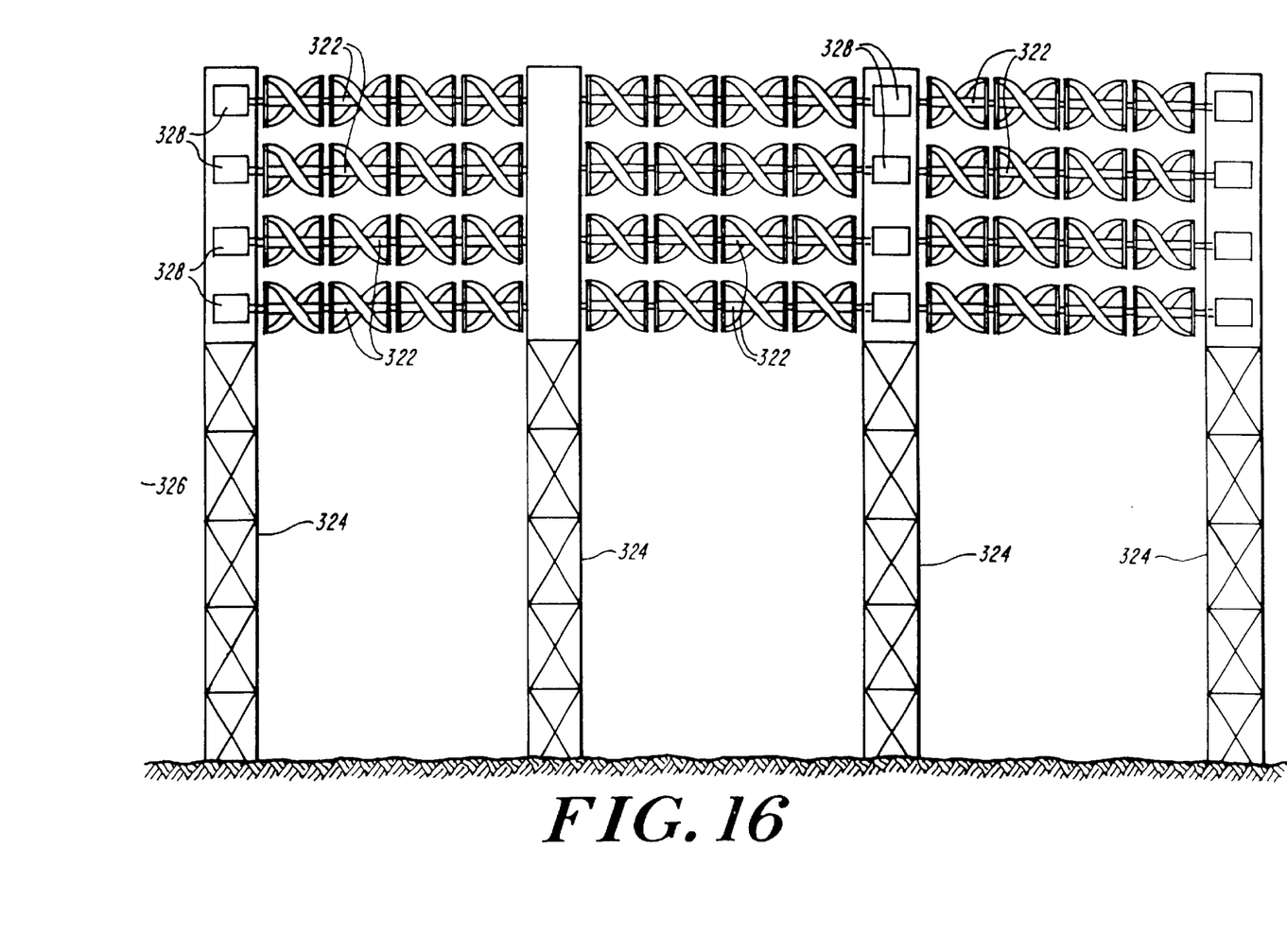
FIG. 16 is a schematic view of an array of the turbine modules of FIG. 14 arranged horizontally.

A further modular embodiment is shown in FIG. 16, in which turbine modules 304 such as in FIG. 14 are arranged in a horizontal configuration. A plurality of horizontally disposed shafts 322 are arrayed vertically in a plane and supported at their ends by suitable truss members arranged to form a lightweight frame 324. The frames are anchored to the ground with guy wires 326. A plurality of generators are supported by the frames in communication with the shafts. Any desired number of modules may be provided in any desired number of rows. The rows may be of any desired length, and any suitable number of frames may be provided to support the desired length.

The array of modular helical turbines is advantageous since it exploits 100% of the rectangular swept cross-sectional area of the blowing wind as well as being self-starting. Traditional propeller-type wind turbines in contrast, must be rotated to face the wind direction and sweep a circular cross-sectional area. The helical turbines provide a uniform non-oscillating rotation, as compared to the prior art Darrieus turbines. The turbines provide unidirectional rotation for any wind direction except parallel or nearly parallel to the shaft, for which case no or very little power can be developed. Also, birds are likely to perceive the array of rotating helical turbines as a solid wall, minimizing the danger of collisions, or the turbine modules can be screened to prevent collisions with birds. The modular system and lightweight frames provide for structural strength and simplicity in assembly and maintenance.

The modular helical turbines are useful in other applications, such as in tidal straight or reversible water currents with no dam construction, or in ultra low-head (less then ten feet) hydropower plants, in, for example, rivers, canals, or tidal estuaries. The modules can be used for small power sources in ocean currents to supply lights or other ocean electrical apparatus. In conventional power plants, the modular helical turbine can be combined in long chains or arrays, which is not possible with conventional propeller type turbines.

The helical turbine of the present invention is also useful to provide propulsion or supplement engine-driven propulsion of a marine vessel utilizing the power of ocean waves. The helical turbine is operable under the multidirectional oscillations of ocean waves. Thus, the helical turbine can develop an axial torque useful in the propulsion of marine vessels.

Figure 19:
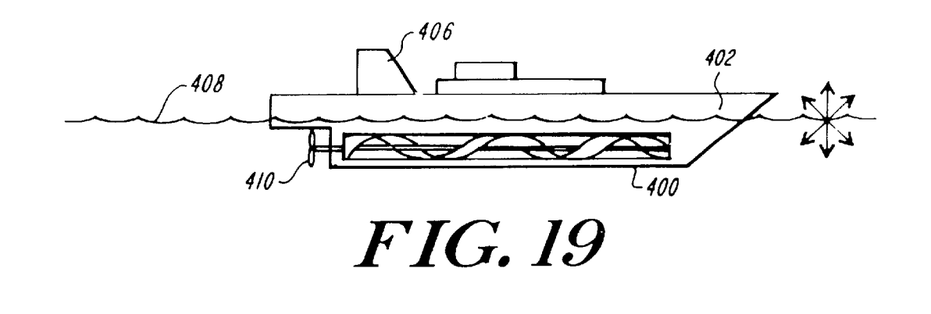
FIG. 19 is a side view of a marine vessel propulsion system of the present invention.
Figure 20:
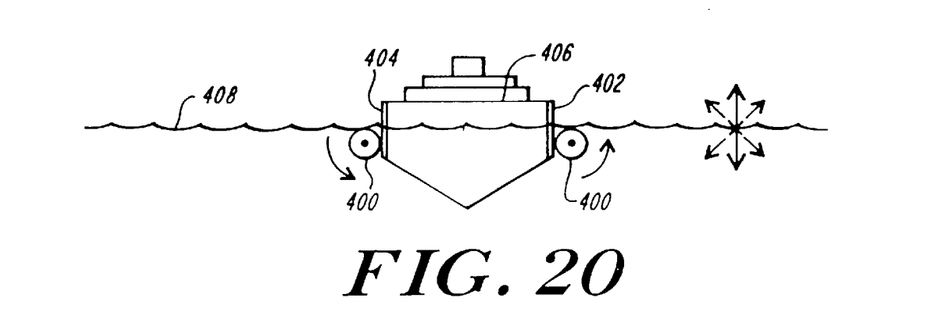
FIG. 20 is a front view of the propulsion system of FIG. 19.

As shown in FIGS. 19 and 20, a helical turbine 400 as described above is mounted along each side 402, 404 of a ship 406 below the water line 408. A propeller 410 is mounted in any suitable manner to the end of each turbine's shaft. Although two turbines are shown, any number, including one, could be used. The turbines provide unidirectional rotation independent of the directions of the waves' oscillations. The turbines are aligned along the ship 406 to provide a forward direction of motion. The longer the turbine's length, the greater the amount of wave power that can be harnessed. The length of the turbines are limited only by the length of the ship.

The helical turbines 400 are beneficial as a propulsion source or supplement, since they are not polluting, are quiet, and conserve fuel required by the ship's engines. Also, the turbines stabilize the ship's rocking by utilizing the wave energy.

Figure 26:
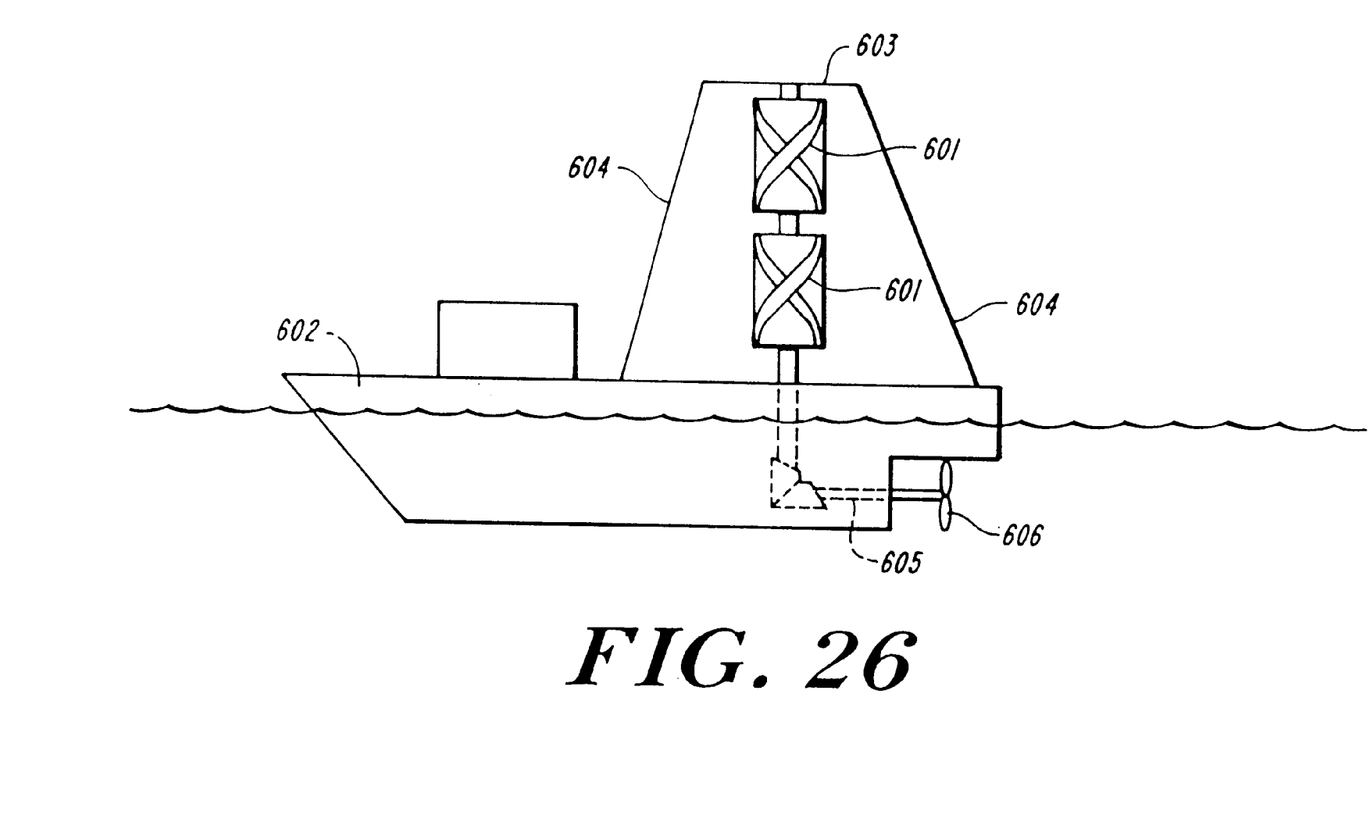
FIG. 26 is a schematic view of a helical turbine as a wind sail for a marine vessel.

The helical turbine in a vertical orientation may also be used as a wind sail for a ship. As shown in FIG. 26, a suitable number of helical turbine modules 601 are attached to the deck of a vessel 602 by a lightweight frame 603 anchored by guy wires 604. In this case, a suitable transmission 605 for interconnection to a horizontal shaft and propeller 606 are provided.

Lifting or lowering of an object in water can also be accomplished with the helical turbine in combination with the cylindrical distributor mounted for rotation with the turbine shaft. The rotating cylinder develops a lifting or lowering force depending on the direction of rotation. For example, if the cylinder is rotating such that its upper surface is moving in the direction of the current flow, the relative velocity of the upper surface with respect to the current flow increases and the pressure thereon decreases, while the relative velocity of the lower surface decreases and the pressure thereon increases. Thus, a lift force is developed on the cylinder. Similarly, if the cylinder rotates in the opposite direction in the same direction of current flow, a lowering force is developed on the cylinder.

Figure 24:
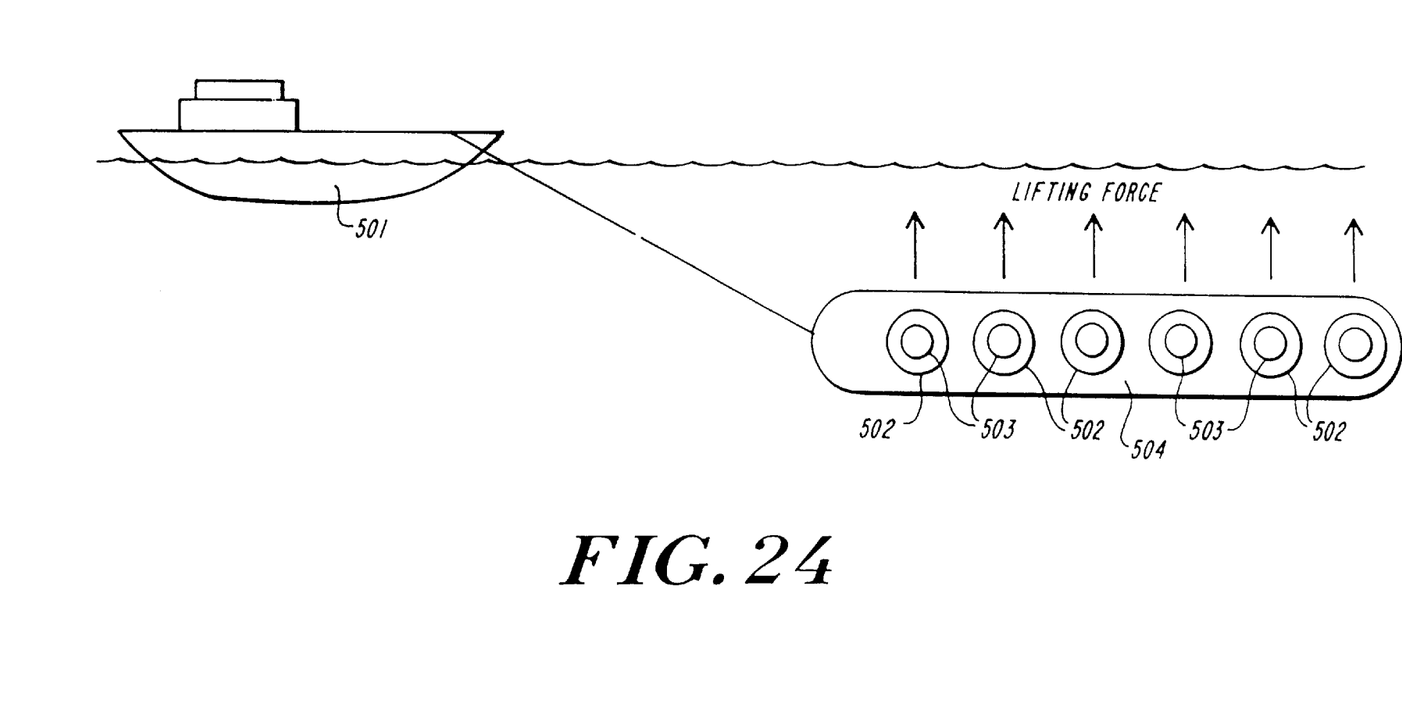
FIG. 24 is a schematic view of a helical turbine and cylindrical distributor used to maintain flotation of a submerged object by developing a lifting force.
Figure 25:
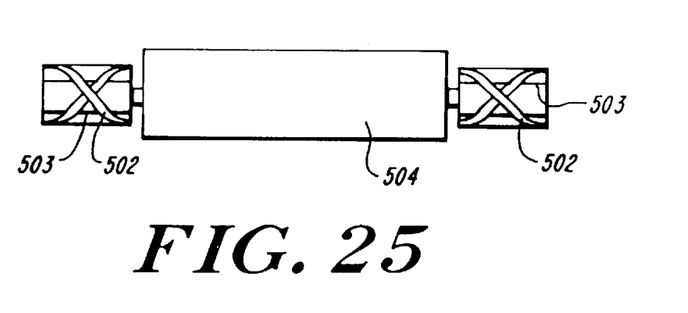
FIG. 25 is an end view of the helical turbine and submerged object of FIG. 24.

Accordingly, relative to a flowing current of water, the rotating cylinder, driven by the helical turbine, can be used to raise or lower an object in water. No additional motor is needed to rotate the cylinder. For example, as shown in FIGS. 24 and 25, a tug boat 501 dragging a plurality of helical turbines 502 and cylinders 503 attached to the sides of a submerged object such as a cargo barge 504 can be used to maintain floatation of or tow the submersible barge without an engine to drive the turbines. The barges can be relatively long and large to hold large amounts of cargo and can be larger than the tug boat.

The invention is not to be limited by what has been particularly shown and described, except as indicated by the appended claims.

What is claimed is:

1. A system for providing wind propulsion of a marine vessel, comprising:

a marine vessel having a propeller; and a cylindrical helical turbine capable of unidirectional rotation under multidirectional fluid flow and mounted to a deck of said marine vessel and connected to a propeller, said helical turbine comprising:

a rotatable shaft mounted to said marine vessel to extend upwardly from the deck of said vessel;

at least one turbine blade support member fixedly mounted to said rotatable shaft for rotation therewith in a plane perpendicular to said shaft; and a plurality of turbine blades having a fixed cylindrical helical configuration mounted to said turbine blade support member for rotation about an axis of said rotatable shaft, each blade having an airfoil shape having a leading edge and a trailing edge and an airfoil profile lying in a plane perpendicular to said shaft, each of said blades fixedly mounted to said blade support member to be radially spaced from said rotatable shaft for rotation in the plane perpendicular to said shaft in the direction of said leading edge; and a transmission interconnecting said helical turbine to said propeller for providing rotation of said propeller.

2. The system of claim 1 wherein said helical turbine comprises a plurality of helical turbine modules.

3. The system of claim 1 wherein said helical turbine is supported by a structure anchored to said vessel by guy wires.

* * * * *

UNITED STATES PATENT AND TRADEMARK OFFICE
CERTIFICATE OF CORRECTION

PATENT NO.   : 6,293,835 B1
DATED        : September 25, 2001
INVENTOR(S)  : Alexander M. Gorlov It is certified that error appears in the above-identified patent and that said Letters Patent is hereby corrected as shown below:

<u>Title page,</u>
Item [62], Related U.S. Application Data, "5,541,138." should read -- 5,451,138. --; and <u>Column 1,</u>
Line 17, "5,541,138," should read -- 5,451,138, --.

Signed and Sealed this

Fourth Day of June, 2002

*Attest:*

JAMES E. ROGAN
*Attesting Officer*          *Director of the United States Patent and Trademark Office*